C. F. JOHNSON, Jr.
Fertilizer Sowers.

No. 154,870.  Patented Sept. 8, 1874.

WITNESSES.
J. P. Th. Lang.
C. L. Evert.

INVENTOR
Chas. F. Johnson Jr.
By Alexander Mator
Attorneys.

UNITED STATES PATENT OFFICE.

CHARLES F. JOHNSON, JR., OF OWEGO, NEW YORK.

IMPROVEMENT IN FERTILIZER-SOWERS.

Specification forming part of Letters Patent No. 154,870, dated September 8, 1874; application filed June 5, 1874.

*To all whom it may concern:*

Be it known that I, CHARLES F. JOHNSON, Jr., of Owego, in the county of Tioga and in the State of New York, have invented certain new and useful Improvements in Fertilizer-Sower; and do hereby declare that the following is a full, clear, and exact description thereof, reference being had to the accompanying drawings, and to the letters of reference marked thereon, making a part of this specification.

The nature of my invention consists in the construction and arrangement of a fertilizer-sower, as will be hereinafter more fully set forth.

In order to enable others skilled in the art to which my invention appertains to make and use the same, I will now proceed to describe its construction and operation, referring to the annexed drawing, in which—

Figure 1:
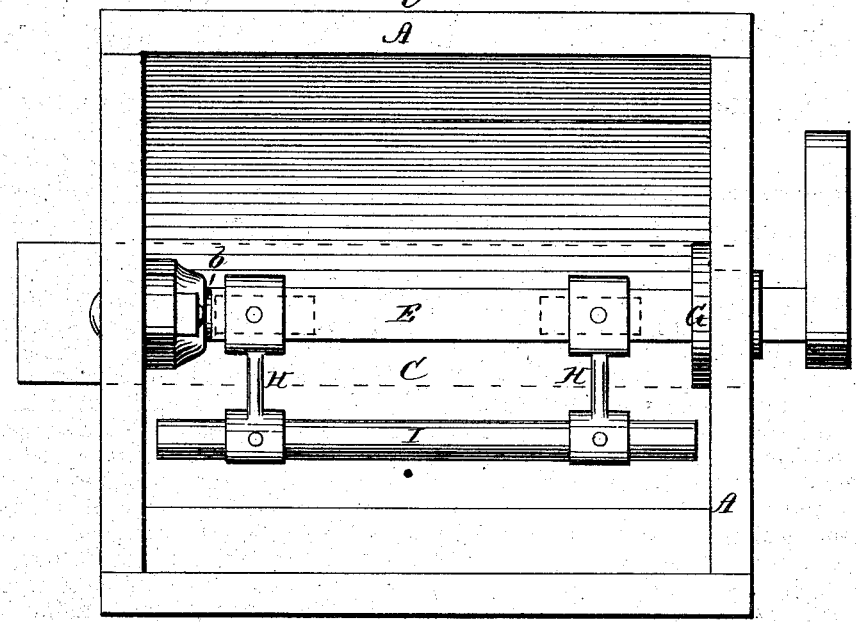
Figure 2:
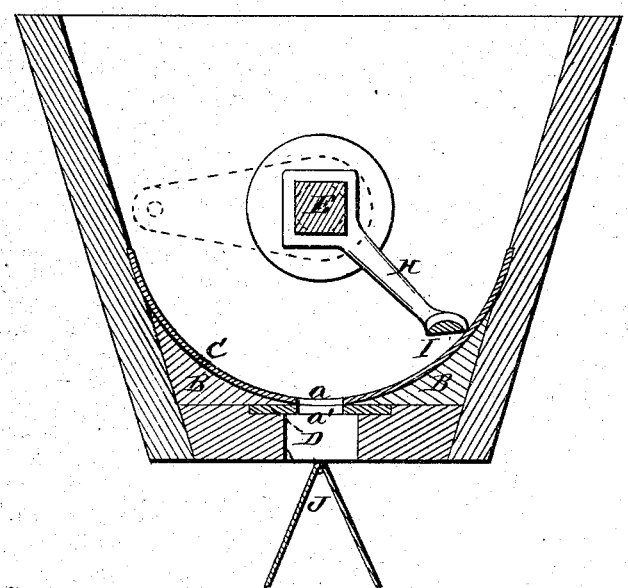

Figure 1 is a plan view, and Fig. 2 a transverse vertical section, of my invention.

A represents the fertilizer-box, the sides being of such an inclination as to insure that the fertilizer contained therein will not adhere to them, but will fall to the bottom as it is fed out. The lower corners are filled out with wood, as shown at B, to a circular form, so as to form a portion of a hollow cylinder coincident with the path of the agitator-rod or wiper. This circular part is covered with galvanized iron C, bent to the same form. The wooden bottom B and the trough-shaped galvanized iron C are pierced with holes $a$ at suitable distances. The wooden bottom B is grooved on top longitudinally, to admit of the passage of a slide, D, of band-iron, pierced with holes $a'$, corresponding in size to the holes $a$ in the galvanized iron C and in the wood, which slide can move longitudinally in its groove directly under the galvanized-iron bottom, and close or open the apertures in it. E represents an iron rock-shaft, made of three-fourths-inch square iron, with one end, $b$, rounded for a journal, and the other end fitted with a round casting, G, so as to make a journal. This shaft is intended to rock or oscillate about thirty degrees, it being driven from the ground-wheel of the machine by gear and crank, or other suitable device. If the length of the shaft E should make it necessary, it is to be provided with a center bearing, to make it run true and keep the wiper at the bottom. On this rock-shaft are a series of malleable-iron arms, H H, with their lower extremities fitted to receive a rod, I, of half-oval iron, which is riveted to the arms, and thus held parallel to the rock-shaft. The arms H are so shaped at their ends, where they are riveted to the half-oval wiper I, that the flat side of said wiper, which is outward from the arms, is at an angle of about thirty degrees or forty degrees with a line drawn from its edge through the center of the rock-shaft, or a radius of oscillation. The path of the lower corner of the wiper is in contact with the galvanized-iron trough C throughout, the upper corner being elevated from it about three-eighths of an inch. The arms H are attached to the wiper I directly over the holes $a$, which is very important, as the wiper may get bent up by stones, nails, or other hard substances being in the fertilizer between the arms. It is necessary that it should wipe close over the holes, so as to keep them open and the edges cleaned; and in the described arrangement the arms hold the wiper close to the bottom, and prevent it from being bent up over the holes.

The object of inclining the wiper, as above described, is that, if the fertilizer is sticky, a flat wiper will spread it and plaster it on the bottom, and soon clog. By making a long wiper, extending the entire length of the box A, the whole mass is slightly agitated; otherwise it will come down only over the holes, and build or bridge over the spaces. The round bottom also facilitates this operation.

As the wiper passes back and forth over the holes, the dropping of the fertilizer through the holes is, of course, interrupted, and an intermittent discharge takes place.

If the fertilizer-sower is attached to a grain-drill, and the fertilizer passes through the hollow hoes into the furrow, it becomes evenly distributed.

If, however, it is desired to sprinkle the fertilizer over the surface of the ground, these pulsations would cause it to be sown in streaks across the path of the machine. This has been attempted to be overcome by dropping the fertilizer onto an inclined board and letting it slide off, which device, however, only partly overcomes the imperfection, as the fertilizer is apt to stick to the board, and slide off in masses when jarred.

I attach beneath the center of the holes $a$ a V-shaped piece, J, of zinc or thin metal, with the apex up, so as to split the discharge, and throw part forward and part back. Making the angle of this V-shaped piece short and sharp, the intermittent stream will reach the ground in a fine shower.

Having thus fully described my invention, what I claim as new, and desire to secure by Letters Patent, is—

The combination, in a fertilizer-sower, of a hopper having a perforated bottom, covered with a curved perforated metal plate, C, a longitudinal rock-shaft, E, having arms H H, and a wiper, I, having an inclined bottom, which is in contact with the metal hopper-bottom, all substantially as set forth.

In testimony that I claim the foregoing I have hereunto set my hand this 1st day of June, 1874.

CHARLES F. JOHNSON, Jr.

Witnesses:
E. H. JACKSON,
C. E. HOLLENBOCK.